US006262991B1

(12) United States Patent
Dyke et al.

(10) Patent No.: US 6,262,991 B1
(45) Date of Patent: Jul. 17, 2001

(54) COMMUNICATION SYSTEM ARCHITECTURE, INFRASTRUCTURE EXCHANGE AND METHOD OF OPERATION

(75) Inventors: Peter John Dyke, Saffron Walden; Brian Michael Unitt; Andrew Paul Lewis, both of Herts, all of (GB)

(73) Assignee: Nortel Networks Limited, Brampton (CA)

( * ) Notice: Subject to any disclaimer, the term of this patent is extended or adjusted under 35 U.S.C. 154(b) by 0 days.

(21) Appl. No.: 08/914,919

(22) Filed: Aug. 19, 1997

(51) Int. Cl.[7] .................................................. H04L 12/28
(52) U.S. Cl. ........................................... 370/420; 375/222
(58) Field of Search .................................... 370/436, 441, 370/442, 410, 420, 463, 419; 379/93.14, 93.28; 348/13; 375/222

(56) References Cited

U.S. PATENT DOCUMENTS

| | | | |
|---|---|---|---|
| 5,430,442 | * 7/1995 | Kaiser et al. | 340/825.79 |
| 5,668,857 | 9/1997 | McHale . | |
| 5,781,617 | * 7/1998 | McHale et al. | 379/93.14 |
| 5,905,781 | * 7/1998 | McHale et al. | 379/93.14 |

OTHER PUBLICATIONS

Netspeed's Loop Runner™ ADSLAM Lowers the Bar on Per–Subscriber ADSL costs Article—Thursday, Jul. 17, 1997.

* cited by examiner

Primary Examiner—Chau Nguyen
Assistant Examiner—Alexander O. Boakye
(74) Attorney, Agent, or Firm—Lee, Mann, Smith, McWilliams, Sweeney & Ohlson

(57) ABSTRACT

An infrastructure exchange (12) has a cross-point switch that is arranged to couple data transmission between subscriber terminals (16, 18), each having a dedicated modem (34), and at least one assignable modem (148) located in the infrastructure exchange (12). The infrastructure exchange (12) comprises fewer assignable modems than a combined number of dedicated modems within the subscriber terminals (16, 18) and, since the cross-point switch (106) is responsive to the data transmission sent via the modems of the subscriber terminals, the cross-point switch (106) thereby acts to concentrate a ratio of dedicated modems to assignable modems.

13 Claims, 3 Drawing Sheets

COMMUNICATION SYSTEM ARCHITECTURE, INFRASTRUCTURE EXCHANGE AND METHOD OF OPERATION

BACKGROUND TO THE INVENTION

This invention relates, in general, to the architecture of a communication system, and is particularly, but not exclusively, applicable to an arrangement of modems in an exchange of a telephone network, such as a public switched telephone network (PSTN).

SUMMARY OF THE PRIOR ART

Telecommunication systems that interconnect subscriber terminals are now capable of supporting broadband data communication on both an inter-subscriber terminal basis (through an exchange) or on a client-server to subscriber terminal basis. In either case, both the subscriber terminal and the infrastructure equipment contain a dedicated modem, which modems are coupled together to support communication between the subscriber terminal and the exchange. In this respect, there is a one-to-one mapping between modems associated with each subscriber terminal and the infrastructure. For example, current broadband access systems that interconnect subscriber terminals and an exchange use copper cabling (usually termed "twisted pair" technology), and conventionally employ two broadband modems, one at each end of the twisted pair.

As will be appreciated, the subscriber terminals may be wire-line telephones that have semi-permanent communication resources assigned between each subscriber terminal and the infrastructure, i.e. the exchange, or may have a dynamically assignable communication resource supported, for example, on a radio frequency (RF) link that is established between a base station sub-system (BSS) of a cellular communication system and the subscriber terminal.

Unfortunately, a significant cost in manufacturing infrastructure relates to the requirement to provide a plethora of modems (provided within line cards) to support the many subscriber terminals that operate within a broadband communication system. As such, it is desirable that the number of modems implemented within a system is minimised.

With respect to the structure of conventional telephony networks and particularly in relation to local telephone exchanges, a saving in each cost-to-customer connection is accomplished by reducing the number of switch-ports needed to service a given number of subscriber terminals. This concentration function is achieved by recognising that, although each subscriber terminal requires a connection to a central switch, the actual connection is discontinuous and bursty and therefore only carries traffic, i.e. information, for relatively short periods of time. As such, for a sufficiently large number of users, the number of switch-ports needed in the exchange is small in proportion to the number of subscriber terminals connected thereto.

For example, if a subscriber terminal, such as a telephone or a computer, utilises a communication resource (i.e. a connection) for only 10% of a peak operating period for the network, a group of subscriber terminals require, on average, only one-tenth the number of switch connections to support all the calls. In this type of system, network operators accept that, occasionally, a subscriber terminal wishing to make a call may not be able to access the switch because all other switch-ports are contemporaneously occupied by other subscriber terminals. However, appropriate dimensioning of the communication system will ensure that a redundancy is built into the communication system, and that switch-port contention (unavailability) only therefore happens very infrequently.

As will be appreciated, the principal of determining an appropriate number of communication resources for the network is based on classic communication theory and is expressed statistically in Erlangs, and it will further be appreciated that optimisation of the system will depend upon the type of traffic supported during each call, i.e. the requirements for video communication systems will differ from those for speech communication.

Like conventional telephony systems, broadband networks achieve a concentration function using an analogous principle. Specifically, while each broadband subscriber is allocated a dedicated modem at both the exchange and at its premises, infrastructure equipment located deeper within the broadband network is shared and therefore dimensioned to provide sufficient capacity to service an expected number of simultaneously active broadband calls. The broadband network cannot therefore provide simultaneous service to all broadband subscriber terminals, and yet broadband modems remain dedicated to a particular subscriber terminal regardless of its usage of the broadband service(s).

As previously stated, the provision of such dedicated modems on a per-line basis is expensive, and is further exaggerated by the increased complexity required in broadband networks. Consequently, there is a significant increase in cost associated with providing a broadband network, which cost is over and above that for a corresponding narrowband telephony system and which therefore discourages wider deployment of broadband systems.

More particularly, a modem is comprised from three functional blocks, with its cost of manufacture heavily dependent upon the processing requirements of the modem. More explicitly, a modem includes line interfaces, digital-to-analog (D/A) converters and a signal processor. The line interfaces provide signals of a suitable amplitude to drive communication signals along the twisted pairs (or the equivalent transmission medium), and also to accept incoming signals. The D/A converter acts to provide an interface between the digital processing functions and the analog signals used on the twisted pairs, and the signal processor provides and implements complex processing logic required to characterise the line and optimise the capacity. It is the complexity of the processor that contributes significantly to the cost of each modem, with this complexity increasing as a function of the number of services (and the information bearing capabilities of each service) supported in the broadband network. Indeed, in relation to broadband communication, generally, types of transmission technology range from simple coding schemes (that are suitable for short distances) to elaborate and complex signalling schemes that achieve greater distance penetration over a communication resource, such as a twisted pair. These more elaborate and complex signalling schemes therefore necessarily require greater processing capabilities and consequently impose additional costs, although very large scale integration can eliminate the necessity for some dedicated, high cost modems.

As such, requirement exists to provide an improved communication infrastructure that supports broadband-type communications but which utilises a reduced number of broadband modems

SUMMARY OF THE INVENTION

According to a first aspect of the present invention, there is provided an infrastructure exchange responsive to a plurality of subscriber terminals each having a dedicated modem that supports data transmission, the infrastructure exchange comprising: at least one assignable modem capable of communicating with the dedicated modem of at least some of the plurality of subscriber terminals; and a first cross-point switch having a plurality of inputs and a plurality of outputs, the first cross-point switch arranged to route data transmission between the plurality of subscriber terminals and the at least one assignable modem; wherein the infrastructure exchange has fewer assignable modems than a combined number of dedicated modems in the plurality of subscriber terminals and the first cross-point switch acts to increase a ratio of dedicated modems in the plurality of subscriber terminals to assignable modems in the infrastructure exchange.

In a second aspect of the present invention there is provided a communication system comprising at least one exchange and a plurality of subscriber terminals each having a dedicated modem that supports data transmission, the infrastructure exchange comprising: at least one assignable modem capable of communicating with the dedicated modem of at least some of the plurality of subscriber terminals; and a first cross-point switch having a plurality of inputs and a plurality of outputs, the first cross-point switch arranged to route data transmission between the plurality of subscriber terminals and the at least one assignable modem; wherein the infrastructure exchange has fewer assignable modems than a combined number of dedicated modems in the plurality of subscriber terminals and the first cross-point switch acts to increase a ratio of dedicated modems in the plurality of subscriber terminals to assignable modems in the infrastructure exchange.

In another aspect of the present invention there is provided a method of transmitting data between a plurality of subscriber terminals each having a dedicated modem and at least one assignable modem of an infrastructure exchange, the at least one assignable modem capable of communicating with the dedicated modem of at least some of the plurality of subscriber terminals, the infrastructure exchange having a cross-point switch and fewer assignable modems than a combined number of dedicated modems in the plurality of subscriber terminals, the method comprising the step of: routing data between the plurality of subscriber terminals and the at least one assignable modem through the cross-point switch, thereby to increase a ratio of dedicated modems in the plurality of subscriber terminals to assignable modems in the infrastructure exchange.

The present invention therefore advantageously provides an ability to improve through a concentration function a ratio of dedicated subscriber-orientated modems to assignable modems located in an infrastructure exchange.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

Figure 1:
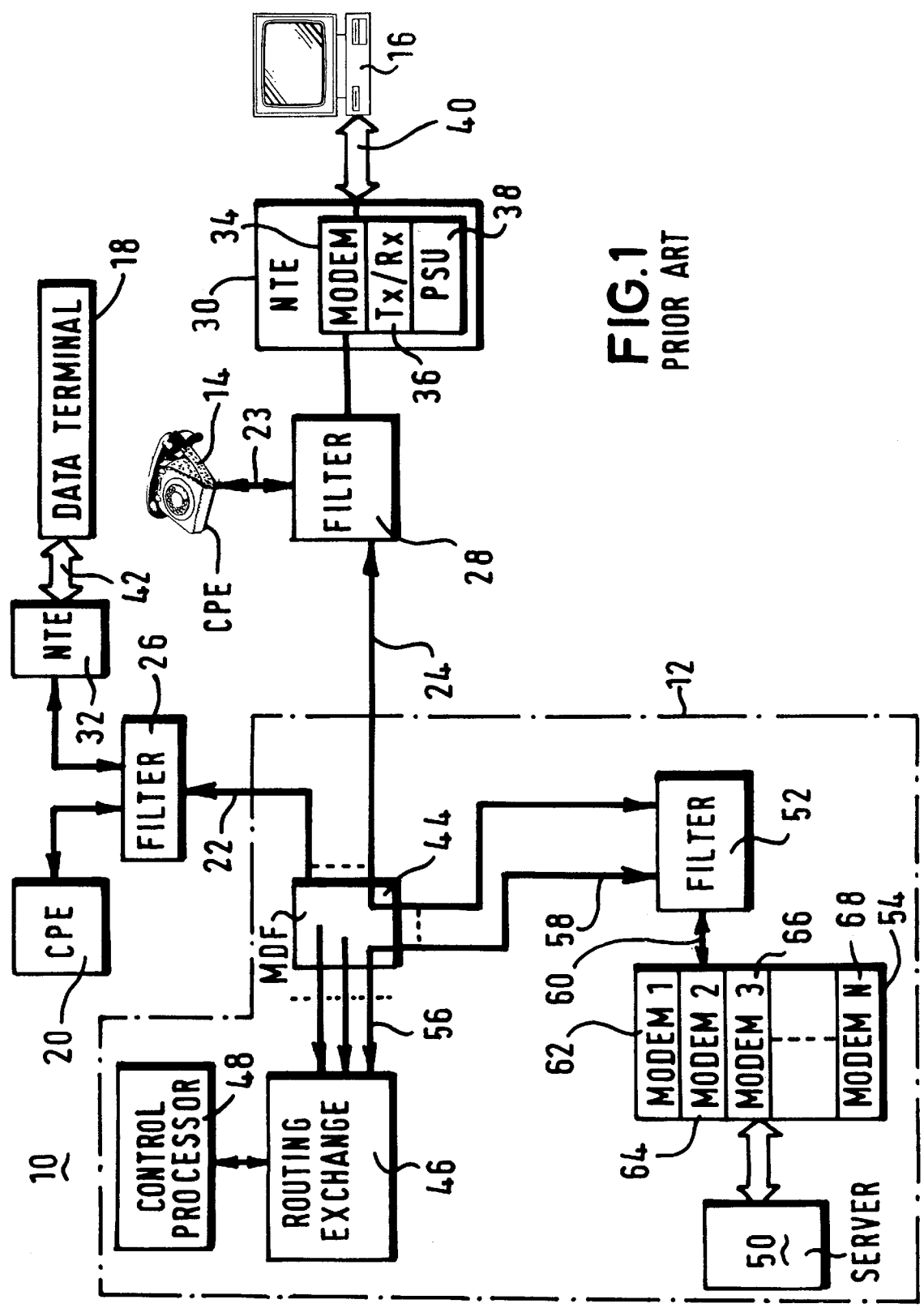
FIG. 1 is a block diagram of a prior art, wire-line communication network.

Before discussing a preferred embodiment of the present invention in detail, a comprehensive discussion of a prior art, wire-line communication network 10 (of FIG. 1) will be presented. The wire-line communication network 10 comprises an exchange 12 that is coupled, via twisted pairs 22–24, to a plurality of subscriber terminals 14–20, such as telephones and computers (generically termed "customer premises equipment"). More particularly, the customer premises equipment will be coupled to the twisted pairs 22–24 through filters 26–28 that provide frequency separation and isolation of voice and data communications, for example. More importantly, the filters 26–28 allow spare spectrum (i.e. a spare frequency channel) on a communication resource to be utilised by providing a separation of broadband signalling from conventionally encoded voice signals. with the broadband transmissions supported by techniques such as asynchronous digital subscriber line signalling (ADSL), high speed digital subscriber line signalling (HDSL) and very high speed digital subscriber line signalling (VDSL). These transmission techniques are generically termed xDSL transmission.

In relation to a telephone 14, a twisted pair directly couples the telephone 14 to an adjacently positioned filter 26–28, whereas a computer 16 or data terminal 18 (or the like) is coupled to the adjacently positioned filter 26–28 via appropriate network terminating equipment (NTE) 30–32. Typically, each NTE 30–32 comprises a modem 34, transceiver or receiver circuitry 36 and a processor that controls operation of the modem 34 and transceiver 36 to coordinate information flow between the exchange 12 and the computer 16 or data terminal 18. The computer 16 or data terminal 18 may be coupled to the NTE 30–32 via a multi-line bus, such as an Ethernet card or RS-232 connection, or a single serial data line 40–42.

In relation to the exchange 12, a main distribution frame (MDF) network 44 provides a connection interface for a plurality of twisted pair connections 22–24 to the exchange 12 (only two of which connections are shown for the sake of clarity). More particularly, as will be appreciated, the purpose of the MDF 44 is to provide an array of connections at a convenient point within the infrastructure and thus to allow cross-patching of one input to any output and vice versa. Moreover, as will be understood, the cross-patching is achieved using a hard interconnect (at a cabling level) and is therefore not subject to any form of dynamic routing.

A routing exchange 46, controlled by a central control processor 48, is coupled to the MDF 44, while the MDF is also coupled to a network server 50 through a filter 52 and a bank of parallel modems 54. Interconnection of the exchange 12, the MDF 44, the filter 52 and the bank of modems 54 is typically implemented using twisted pairs 56–60, although dedicated buses and optical fibre may be used.

Generally, the filters 26–28 and 52 within the communication network 10 are of notched characteristic to distinguish between distinct and independent channel resources, such that telephony and broadband signals are separately isolated from one another.

As previously indicated, a conventional approach to providing broadband services to a plurality of subscriber terminals 14–20 from an exchange 12 shares some common infrastructure equipment, namely a broadband multiplexer (not shown) and the physical signalling links that connect to the network server 50. In the prior art, wire line network of FIG. 1, it can therefore be seen that, for a broadband connection, each digital subscriber terminal is allocated, on a permanent basis, an individual modem 62–68 within the exchange 12.

Figure 2:
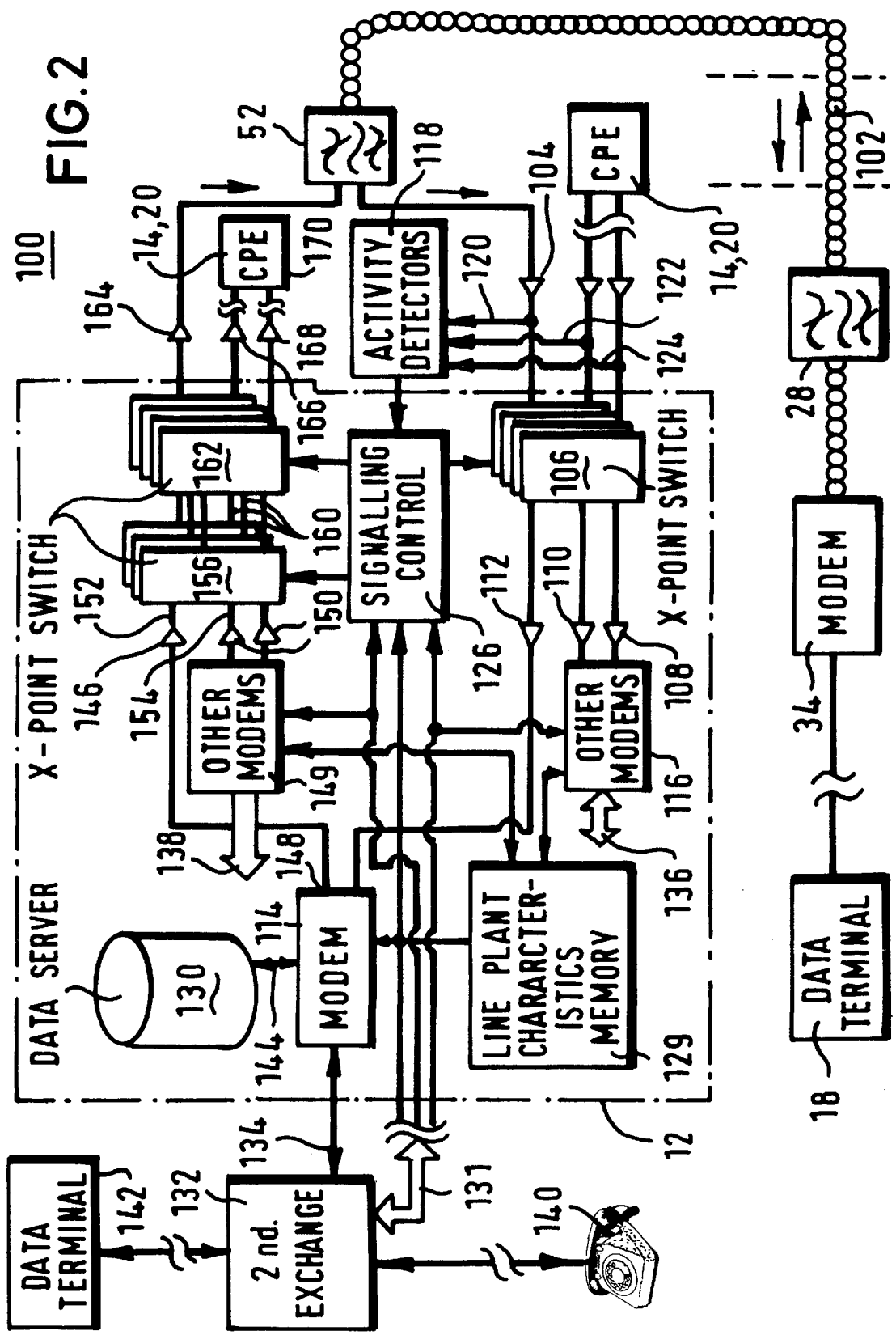
FIG. 2 represents a communication system according to a preferred embodiment of the present invention.

Referring now to FIG. 2, there is shown a block diagram of a communication system 100 in accordance with a preferred embodiment of the present invention. In FIG. 2, equipment common with the prior art shares a common numbering scheme. A data terminal 18 (or other suitable customer premise equipment 14–20) is coupled through a dedicated modem 34 to a filter 28, as has been previously described in FIG. 1. The filter 28, subsequently referred to as being proximate to the customer premises equipment 14–20, is interconnected to a second filter 52 through a communication resource 102, shown as a twisted pair. The second filter 52 is located adjacent an exchange 12 and is arranged to separate telephony signalling from broadband data communication, as previously described.

As will be appreciated, the exchange 12 may be a PSTN or a BSS and merely provides an interface between a subscriber terminal world and an infrastructure world.

An output from the second filter 52 is coupled through an amplifier 104 to a first cross-point switch 106 located within the exchange 12. The cross-point switch 106 is actually receptive to a multitude of amplified and filtered information signals that originate from CPEs 14–20. The first cross-point switch 106 has the effect of distilling the number of input signalling lines down to a lesser number of outputs lines (which in the limit can represent a many-to-one mapping). Outputs from the first cross-point switch 106 are again amplified by a parallel bank of line amplifiers 108–112 before being individually provided to a modem 114 (or a number of dedicated modems 116, as necessary) located within the exchange 12.

An activity detector 118 is arranged to receive amplified signals 120–124 that are tapped from individual inputs to the first cross-point switch 106. The activity detector 118, which may be located outside the exchange 12, performs the function of identifying the presence of information (i.e. signals) on an uplink (or upstream), while the first cross-point switch 106 is responsive to a signalling control processor 126 that is itself operationally responsive to the presence of information (as detected by activity detector 118). Typically, the activity detector 118 is arranged to listen simultaneously to several lines. Each modem 114–116 in the exchange 12 is responsive to a line-plant characteristic memory 129 that stores information pertaining to ongoing calls, e.g. signalling protocols, allocated channel bandwidth and address information.

Optionally, each modem in the exchange 12 may also be responsive to a data server 130, shown as residing in the exchange 12 for the purpose of explanation only, that is accessible by the subscriber terminals 14–20 on a data-on-demand basis. The data server 130 may alternatively be a video library or some other form of information repository, such as an internet server.

Signalling that administers set-up, tear-down and general control of calls is communicated over a signalling bus 131 that couples the signalling control processor 126 within the exchange 12 to a second signalling control processor located in an adjacent or interconnected (second) exchange 132. Additionally, each modem 114–116 within the exchange 12 is further coupled, over a communication resource 134–138, to the interconnected or adjacent exchange 132, which interconnected or adjacent exchange 132 is arranged to similarly service customer premises equipment, such as telephones 140 and data terminal 142. Each modem 114–116 in the exchange 12 is further coupled to the signalling control processor 126 and the signalling bus 131.

Outputs from the first cross-point switch 106 are selectively routed to an allocated modem (e.g. modem 148), with the modem ultimately selected and controlled by the signalling control processor 126. A route through the first cross-point switch 106 is controlled by the signalling control processor 126, although the signalling control processor 126 is only activated in response to the activity detector 118 identifying the presence of data on an input to the first cross-point switch 106.

In a downlink (or downstream) from the exchange 12 to the subscriber terminal 18, the interconnected or adjacent exchange 134 is coupled through at least one modem, in this instance modem 114. In the case of a central data repository that resides in the exchange 12, there may not be any additional coupling to other exchanges. As such, the data server 130 may provide information 144 for transfer to the subscriber terminal 18 via the modem 114.

The transfer of information through the modem 114 (potentially from the interconnected or adjacent exchange 132) is subject to amplification in an amplifier 146 coupled to an output 148 of the modem 114. Clearly, if additional modems 148 are present in the downlink, then outputs from these additional modems may also be subject to amplification in dedicated amplifiers 148–150. The additional modems 148 will also be subject to similar connection schemes to those previously described, e.g. in relation to control, set-up and tear-down signalling. coupling to the data server 130 and coupling to any interconnected or adjacent exchange 132.

After amplification in the downlink, amplified information signals 152–154 are provided to a second cross-point switch 156 that acts to route each input to a multitude of outputs 160. Conversely to the uplink case, there are fewer input ports in the second cross-point switch 156 (in the downlink) than there are output ports provided from the second cross-point switch 156. Optionally, outputs from the second cross-point switch may be applied to a serially coupled third cross-point switch 162, which third cross-point switch 162 again acts to increase the effective concentration of modems in the exchange to subscriber terminals 18. Similarly, the third cross-point switch may be coupled in series to other cross-point switches that each serve to concentrate further a ratio dedicated subscriber-orientated modems and assignable modems located in the exchange 12.

Similarly, in the uplink, a fourth cross-point switch (not shown) may also be serially coupled to the first cross-point switch 106, thereby to concentrate further the number of subscriber terminals to the number of modems in the exchange 12.

Again, returning to the downlink, individual outputs from the cross-point switch (whether these emanate from the second cross-point switch 156 or the third cross-point switch 162) are subject to an amplification process, if required, in a bank of parallel line amplifiers 164–168. Following amplification, individual calls are coupled, on a semi-permanent basis, through the filter 52 (adjacent the exchange 12) and then across the communication resource 102 to, ultimately, the customer premises equipment 170, such as data terminal 18. More particularly, downlink transmissions will also be subjected to filtering in filter 28 (that is proximate to the subscriber terminal) before being applied to the modem 34 specifically dedicated to the data terminal 18. Again, the purpose of the filter is to separate broadband data channels from narrowband voice channels, for example.

In relation to downstream transmissions from the exchange 12 to appropriate subscriber terminals, an xDSL modem is allocated to the customer requiring service by the signalling control processor 126. The signalling control processor 126 then operates to establish a route through the second cross-point switch 156 (or, optionally, through a series of cross-point switches) to the allocated communication resource 102 that is assigned to the subscriber terminal, e.g. data terminal 18.

While equipment on the customer premises cannot be shared, the present invention has identified the opportunity for some of the per line equipment in the exchange to be shared further than is conventionally achieved. The block diagram of FIG. 2 shows the functions within an exchange that may be shared, and identifies that equipment which, by necessity, must be provided on a one per customer basis. Clearly, the concentration function provided by the cross-point switches (or series combination of cross-point switches) will depend upon the services offered by the service provider and so the concentration function will therefore be subject to calling rates and call duration considerations. However, in most cases, it is desirable to connect as many subscriber terminals as possible from a single distribution point, e.g. from a local exchange. This mentality allows for economies of scale and an associated cost reduction as a consequence of reduced infrastructure complexity (on a per line basis).

The present invention allows broadband modems to be concentrated (i.e. shared) at each exchange or interface between a subscriber terminal world and an infrastructure world. This means that a customer does not need a dedicated modem at the exchange, but can call one up as required. This sharing of broadband modems reduces the number of modems required from 2 (two) per subscriber terminal to, for example, 1.2 (one point two) per subscriber terminal, depending upon the concentration ratio used within the cross-point switches. The present invention therefore provides a significant cost reduction in the deployment of broadband services. In other words, as will now be understood, concentration of modems required for more complex coding schemes (that can support high data rates approaching ten megabits per second (MBPS) over significant cabling lengths approaching one kilometre or more) can be supported by the present invention.

Figure 3:
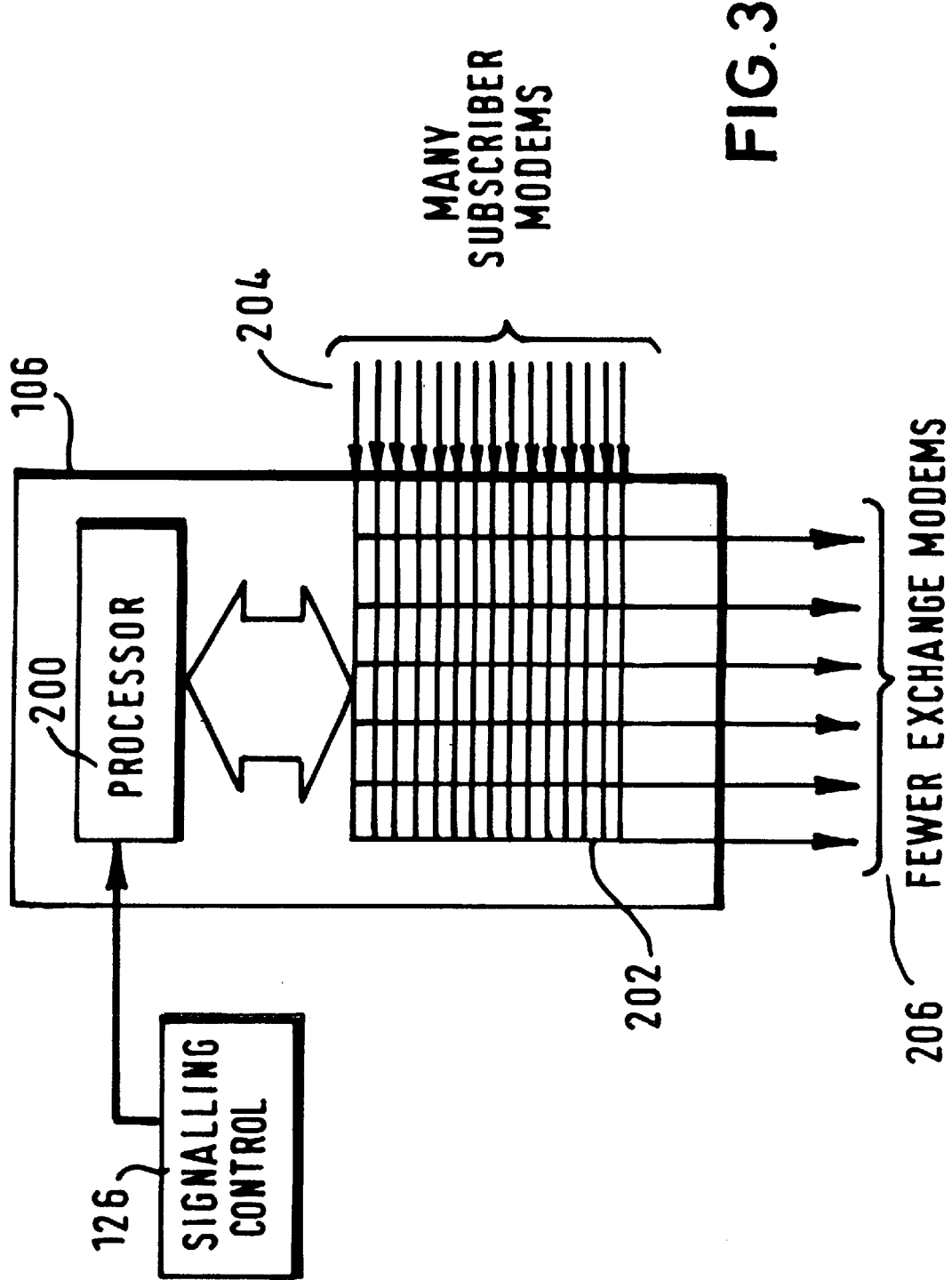
FIG. 3 illustrates a convention cross-point switch.

Briefly, referring to FIG. 3, there is shown a block diagram of a cross-point switch, such as first cross-point switch 106. The cross-point switch 106 is, typically, digitally controlled by an internal processor 200 that is responsive to signalling control processor 126 of FIG. 2. The cross-point switch comprises an array of switch connections 202 located at intersections between an input interface 204 and an output interface 206. Consequently, the internal processor 200 can route any input to any output by selectively making or breaking switch connections 202. As can be seen, in relation to the cross-point switch 106 of the present invention, there are more inputs in the input array 204 than there are outputs in the output array 206, which hence leads to a concentration of dedicated subscriber modems to exchange modems (in a many-to-fewer relationship).

In summary, the present invention achieves an increased economy in relation to developing and deploying, for example, a broadband network; with a cost saving derived from the sharing of modems within the exchange. In other words, the present invention has eliminated the requirement for a dedicated line card function per customer with only line drivers and receivers required on a per customer basis. Appropriately located cross-point switches, capable of transmitting analog or digital signals, are used to implement the concentration function of the present invention. Additionally, both the line interface function and the analog-to-digital conversion function could be equipped on a per subscriber terminal basis. while the concentration function within the cross-point switches could be implemented using digital techniques.

It will, of course, be understood that the above description has been given by way of example only and that modifications of detail may be made within the scope of the present invention. For example, rather than using distinct cross-point switches for the uplink and downlink, a solitary cross-point switch could be implemented within the exchange, provided that control of the cross-point switch is orchestrated by a bidirectional switch controller (typically controlled and located within the signalling control processor 126, as will be understood). Additionally, while the exchange of the present invention is shown as being connected to a second exchange, there may not be a need for this connection if the exchange constitutes a repository for a central data server. In this respect, an uplink request could be routed to a data server (such as a video server), which data server would, in turn, provide requested information through the downlink cross-point switch to the subscriber terminal 18.

Additionally, while the cross-point switch has been described in the context of an analog implementation, it will of course be appreciated that the cross-point switch can be implemented digitally. Clearly though, in a digital environment, such a digital cross-point switch would need to be located after an A/D converter, albeit that its operational effect would be identical to the analog case.

We claim:

1. An infrastructure exchange responsive to a plurality of subscriber terminals each having a dedicated modem that supports data transmission, the infrastructure exchange comprising:

at least one assignable modem capable of communicating with the dedicated modem of at least some of the plurality of subscriber terminals; and a first cross-point switch having a plurality of inputs and a plurality of outputs, the first cross-point switch arranged to route data transmission between the plurality of subscriber terminals and the at least one assignable modem;

a second cross-point switch, the first cross-point switch coupled to receive data transmissions form the plurality of subscriber terminals and the second cross-point switch coupled to provide data transmission from the at least one assignable modem to the plurality of subscriber terminals:

wherein the infrastructure exchange has fewer assignable modems than a combined number of dedicated modems in the plurality of subscriber terminals and the first cross-point switch acts to increase a ratio of dedicated modems in the plurality of subscriber terminals to assignable modems in the infrastructure exchange, and the first cross-point switch allows bidirectional data transmission between the dedicated modems in the plurality of subscriber terminals and the assignable modems in the infrastructure exchange.

2. The infrastructure exchange according to claim 1, further comprising at least one additional cross-point switch coupled to series with the first cross-point switch.

3. The infrastructure exchange according to claim 1, further responsive to an activity detector arranged to indicate a presence of data transmission.

4. The infrastructure exchange according to claim 3, further comprising a control processor, responsive to the activity detector, for controlling routing of data transmission through the first cross-point switch.

5. The infrastructure exchange according to claim 1, further responsive to a data server, the data server coupled to at least one of the at least one assignable modem and being arranged to provide data-on-demand to each of the plurality of subscriber terminals.

6. The infrastructure exchange according to claim 1, wherein the at least one assignable modem is coupled to a remote secondary exchange.

7. The infrastructure exchange according to claim 1, wherein the at least one assignable modem and the each of the dedicated modems are broadband modems.

8. The infrastructure exchange according to claim 1, wherein the data transmission is supported on a communication resource having a voice channel that is isolated from the data transmissions.

9. The infrastructure exchange according to claim 8, wherein the isolation is in frequency.

10. The infrastructure exchange according to claim 8, wherein the infrastructure exchange is one of a public switched telephone network and a cellular communication system.

11. The infrastructure exchange according to claim 10, wherein and the data transmission is supported, respectively, over a twisted pair and a radio frequency communication resource.

12. A communication system comprising at least one exchange and a plurality of subscriber terminals each having a dedicated modem that supports data transmission, the infrastructure exchange comprising:

at least one assignable modem capable of communicating with the dedicated modem of at least some of the plurality of subscriber terminals; and a first cross-point switch having a plurality of inputs and a plurality of outputs, the first cross-point switch arranged to route data transmission between the plurality of subscriber terminals and the at least one assignable modem;

a second cross-point switch, the first cross-point switch coupled to receive data transmissions from the plurality of subscriber terminals and the second cross-point switch coupled to provide data transmission from the at least one assignable modem to the plurality of subscriber terminals;

wherein the infrastructure exchange has fewer assignable modems than a combined number of dedicated modems in the plurality of subscriber terminals and the first cross-point switch acts to increase a ratio of dedicated modems in the plurality of subscriber terminals to assignable modems in the infrastructure exchange, and the first cross-point switch allows bidirectional data transmission between the dedicated modems in the plurality of subscriber terminals and the assignable modems in the infrastructure exchange.

13. A method of transmitting data between a plurality of subscriber terminals each having a dedicated modem and at least one assignable modem of an infrastructure exchange, the at least one assignable modem capable of communicating with the dedicated modem of at least some of the plurality of subscriber terminals, the infrastructure exchange having a first cross-point switch and a second cross-point switch and fewer assignable modems than a combined number of dedicated modems in the plurality of subscriber terminals, the method comprising the step of:

routing data between the plurality of subscriber terminals and the at least one assignable modem through the cross-point switch, thereby to increase a ratio of dedicated modems in the plurality of subscriber terminals to assignable modems in the infrastructure exchange, wherein the first cross-point switch allows bi-directional data transmission between the dedicated modems in the plurality of subscriber terminals and the assignable modems in the infrastructure exchanges, the first cross-point switch coupled to receive data transmissions from the plurality of subscriber terminals and the second cross-point switch coupled to provide data transmissions from the at least one assignable modem to the plurality of subscriber terminals.

* * * * *